Feb. 25, 1964  G. I. HAUK ETAL  3,122,149
MILKING SYSTEMS
Filed Jan. 4, 1960  5 Sheets-Sheet 1

FIG. 1

INVENTORS
GEORGE I. HAUK
THOMAS C. BAKER
BY Rey Eilers ATT'Y.

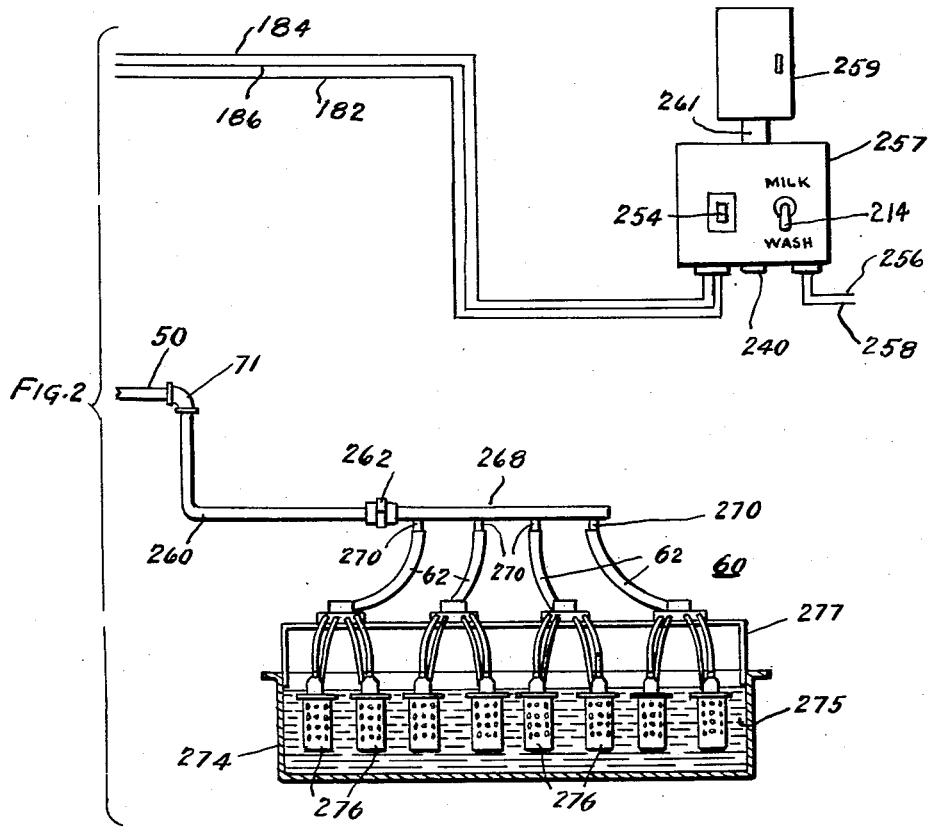
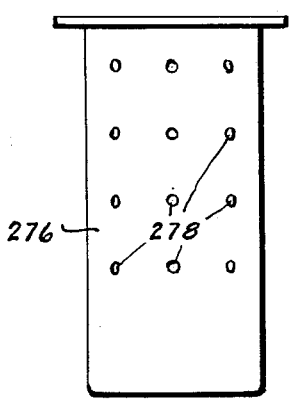
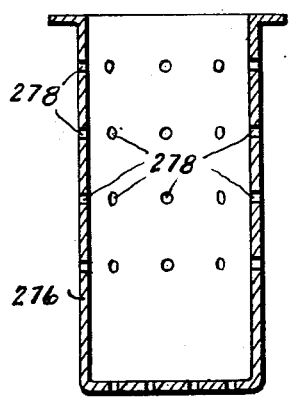
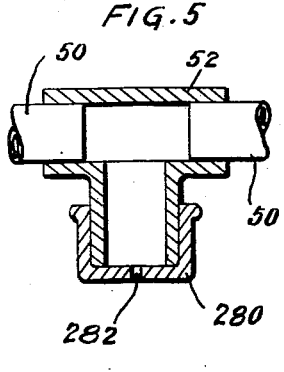
INVENTORS
GEORGE I. HAUK
THOMAS C. BAKER

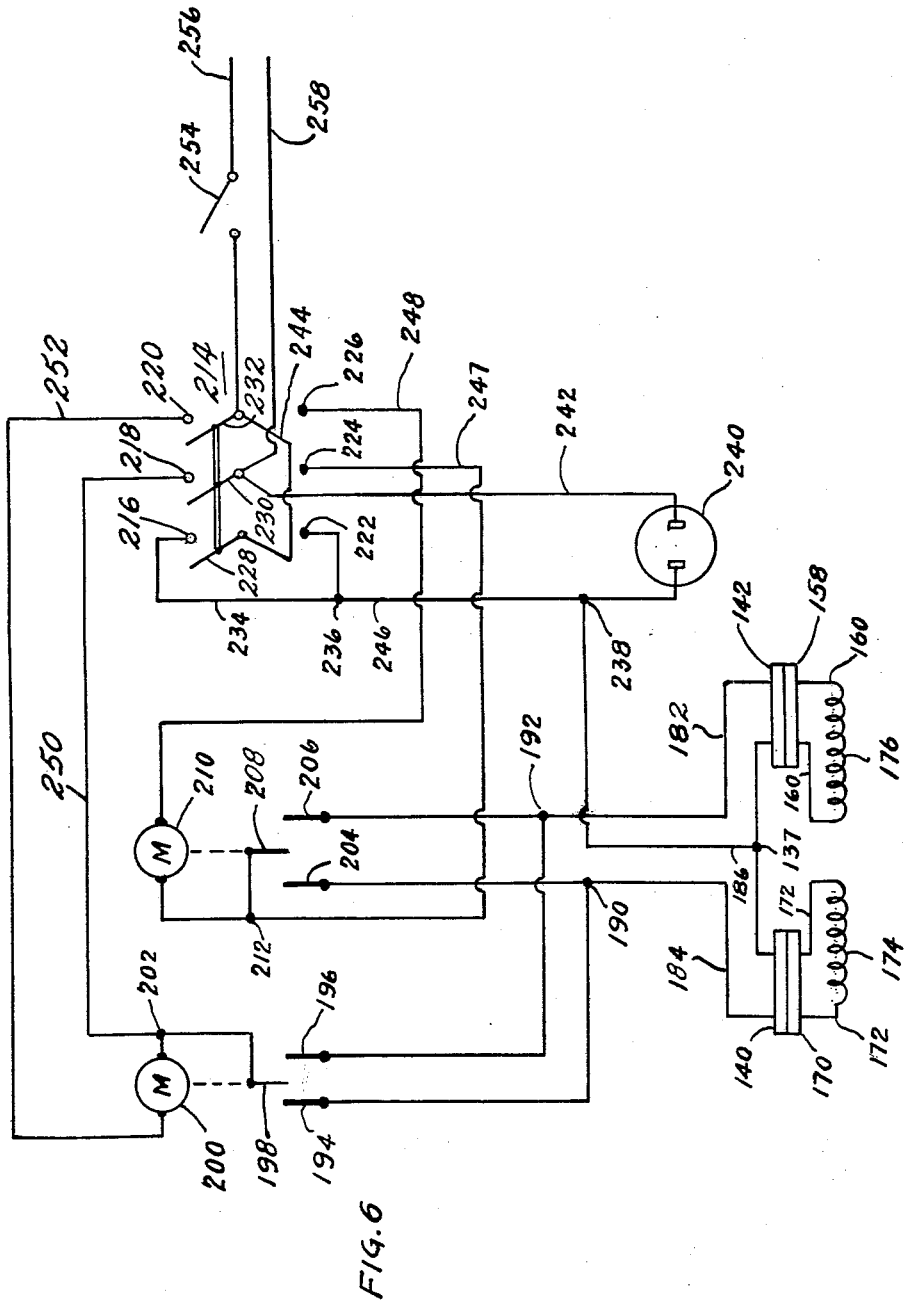

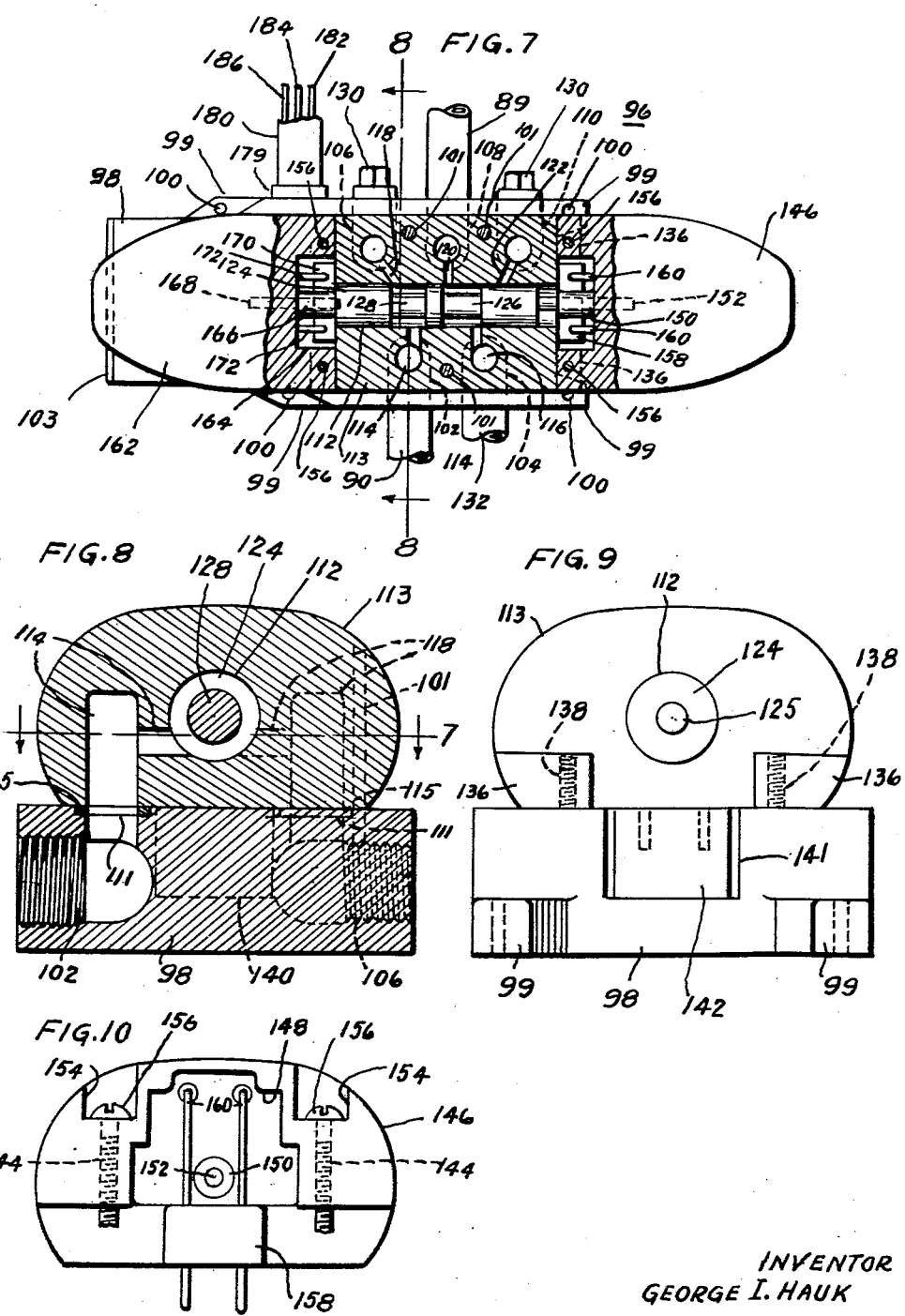

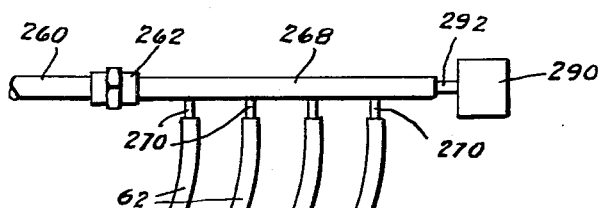
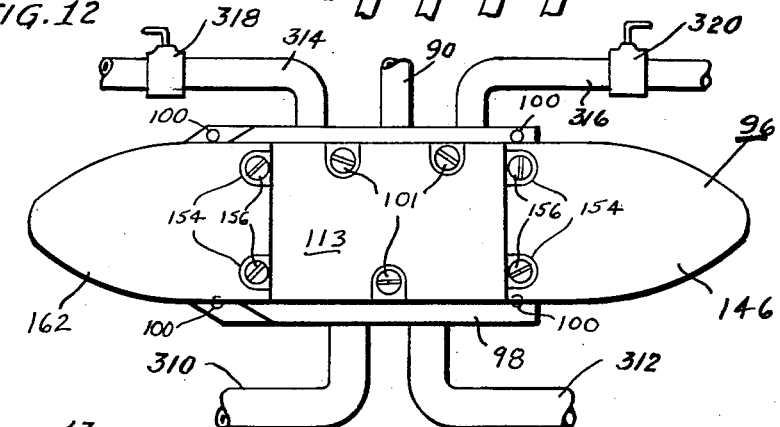
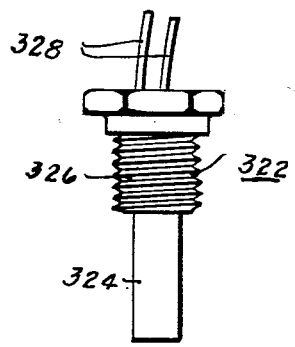
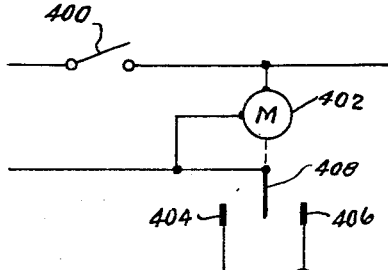
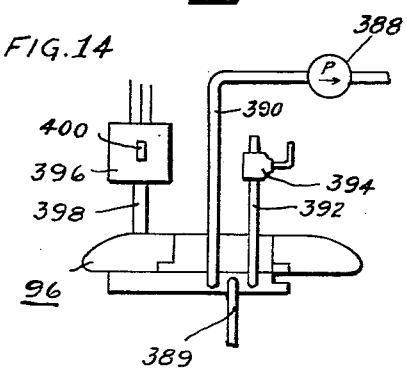
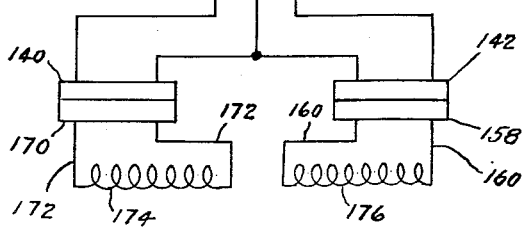

United States Patent Office 3,122,149
Patented Feb. 25, 1964

3,122,149
MILKING SYSTEMS
George I. Hauk, Glendale, and Thomas C. Baker, St. Louis, Mo., assignors to Hauk Milker Manufacturing Company, Kirkwood, Mo., a corporation of Missouri
Filed Jan. 4, 1960, Ser. No. 271
21 Claims. (Cl. 134—58)

This invention relates to improvements in milking systems. More particularly, this invention relates to improvements in controls for milking systems.

It is therefore an object of the present invention to provide an improved cotnrol for milking systems.

Many milking systems include a vacuum pump that creates a reduced pressure, include a vacuum line that extends from that pump to the various stalls in the milking parlor, include a milk line that extends from the stalls in the milking parlor to a milk-collecting tank, and including a number of milking units that are connectable to the vacuum line and to the milk line. The milking units draw the milk from the cows, and the milk line conducts the milk to the collecting tank. To keep the milk free of contamination and of rancidity, the milk line, the collecting tank, and the milking units are cleaned after each use. With some milking systems it is necessary to disassembly the milk line to clean it; and any such disassembly is objectionable because of the time and labor involved. Consequently, it would be desirable to provide a milking system that has a milk line that could be cleaned without any need of disassembling that line. The present invention provides such a milking system, and that milking system cleans the milk line by drawing a cleaning and washing solution up into that milk line. The present invention draws the cleaning and washing solution up into that milk line in a very simple and easy manner, and it does so without using expensive and complicated equipment. It is therefore an object of the present invention to provide a simple and inexpensive milking system wherein a cleaning and washing solution can be drawn up into the milk line.

The milking system provided by the present invention has a pulsator that alternately connects the vacuum line to the vacuum pump or to the ambient atmosphere; and, in doing so, that pulsator alternately causes the pressures in the entire vacuum line to fall and rise. The resulting falls and rises in the pressures within the entire vacuum line enable the milking units to draw milk from the cows during those periods when the milking system is used to milk the cows; and those falls and rises also make it possible to alternately draw a cleaning and washing solution into, and then release it from, the milk line during those periods when the milking system is to be cleaned. As a result, the pulsator provided by the present invention can be used to control the operation of the milking system when that system is being cleaned as well as when that system is being used to draw milk from the cows. It is therefore an object of the present invention to provide a pulsator that alternately connects the vacuum line to the vacuum pump or to the ambient atmosphere, and thereby provides alternate falls and rises in the pressures, in the entire vacuum line, and that can be used to control the washing operation as well as the milking operation of the milking system.

During the periods when the milking system is used to draw milk from the cows, each of the milking units has one of its hoses connected to the milk line and has its other hose connected to the vacuum line; and those milking units will respond to the successive falls and rises in the pressures in the entire vacuum line to draw the milk from the cows. To milk the cows as rapidly as possible, the pulsator will be arranged to make the successive falls and rises in pressure of short duration. However, during the periods when the milking system is being used to clean the milk line, the pulsator will be arranged to increase the duration of the successive falls and rises in the pressures in the entire vacuum line. This means that the pulsator must be capable of providing time cycles of different lengths; and the present invention provides such a pulsator. That pulsator has two electromagnetic coils that shift a valve element; and two separate timers, having different time cycles, are provided that can be connected to those coils at different times. When one of those timers is connected to those coils, those coils will shift the valve element back and forth quite frequently and thereby provide successive falls and rises, of short duration, in the pressures in the entire vacuum line. When the other of those timers is connected to those coils, those coils will shift the valve element back and forth less frequently and thereby provide successive falls and rises, of longer duration, in the pressures in the entire vacuum line. It is therefore an object of the present invention to provide a pulsator with a movable valve element and two electromagnetic coils and to provide two separate timers, with different time cycles, that can be connected to those coils at different times.

Not only does the use of one pulsator, to control the pressures throughout the entire vacuum line, make it possible to use the successive falls and rises in pressure in that vacuum line to control both the milking of the cows and the cleaning of the milk line, but the use of that one pulsator also makes it very simple to vary the durations of the time cycles of all the milking units, as by merely changing the time cycles of the milking timer. Furthermore, the use of that one pulsator obviates the costs and the maintenance problems which the use of a separate pulsator for each milking unit would entail. In addition, the use of just one pulsator makes it easy to vary the levels to which the pressures in the vacuum line fall; and this is desirable because one or more of the cows in a dairy herd is or are usually "hard milkers" and require lower-than-usual pressures in the vacuum line. With the present invention, it is possible for the dairyman to milk all of his "easy milkers" while the pressures in the vacuum line are within the normal range, and then, by a simple adjustment, materially reduce the pressures in the vacuum line so he can then milk his "hard milkers." The ability of the milking system provided by the present invention to effect changes in the pressure ranges within the vacuum line, by means of a simple adjustment, materially speeds up the milking of a herd.

The change in the pressure ranges within the vacuum line is made possible by equipping the pulsator with a valved connection to the ambient atmosphere. When that valved connection is wide open the amount of air drawn into the vacuum line, during those periods when the pulsator connects that vacuum line to that ambient atmosphere, is great enough to keep the pressures in that vacuum line within a normal range; but when that valved connection is partially closed the amount of air drawn into the vacuum line, during those periods when the pulsator connects that vacuum line to that ambient atmosphere, is reduced and will reduce the pressures within that vacuum line. Hence, to attain the increased vacuum that is needed in the milking system to milk "hard milkers," the dairyman need only adjust the extent to which the valved connection is open; and this is easily accomplished by the mere turning of a valve handle. It is therefore an object of the present invention to provide an adjustable valved connection between the pulsator of a milking system and the ambient atmosphere.

During those periods when the milking system is being used to wash and clean the milk line, the milking units will be separated from the vacuum line and from the milk line, and the vacuum line will be connected to one end of the milk line through the medium of a tank. That tank will be elevated above the level of the milk line, and it will be large enough to accommodate a large volume of cleaning and washing solution. A second tank will be connected to the milk line adjacent the other end of that milk line; and that tank will be below the level of the milk line. The second or lower tank will be larger than the elevated tank so that it will be able to accommodate all of the cleaning and washing solution held in the elevated tank plus all of the cleaning and washing solution held in the milk line. When the pulsator connects the vacuum line to the vacuum pump, the cleaning and washing solution will be drawn up into the milk line and then caused to move into the elevated tank; and when the pulsator subsequently connects the vacuum line to the ambient atmosphere, the cleaning and washing solution will drain back out of the elevated tank and out of the milk line and into the lower tank. In passing into and through the milk line, the cleaning and washing solution will clean that milk line. It is therefore an object of the present invention to provide a milking system with an elevated tank that can connect the vacuum line to one end of the milk line and with a lower tank that is connectable to the milk line adjacent the other end of that milk line.

In causing the cleaning and washing solution to pass through the milk line and collect in the elevated tank, and then in subsequently permitting that cleaning and washing solution to pass wholly out of that milk line and into the lower tank, the present invention recurrently enables the residual milk in the milk line to be distributed substantially uniformly throughout that cleaning and washing solution. This is in strong contrast to a milking system wherein a relatively small quantity of cleaning and washing solution is introduced into the milk line and then is merely moved back and forth within that milk line. In such a system, the cleaning and washing solution becomes so highly charged with residual milk that the cleaning and washing action of that cleaning and washing solution is impaired. The present invention obviates this problem by providing a quantity of cleaning and washing solution that greatly exceeds the volumetric capacity of the milk line, by recurrently causing that cleaning and washing solution to pass through the milk line and collect in the elevated tank, and by recurrently permitting that cleaning and washing solution to drain back into the lower tank. It is therefore an object of the present invention to provide a milking system wherein a quantity of cleaning and washing solution that greatly exceeds the volumetric capacity of the milk line is recurrently passed through that milk line and collected in an elevated tank and then is recurrently permitted to drain back out of that milk line and collect in a lower tank.

The lower tank is made just large enough so the amount of cleaning and washing solution that can be drawn from it is just enough to fill the milk line and to substantially fill the elevated tank. As a result, no matter how full the dairyman fills the lower tank, he will not be able to cause the elevated tank to overflow. This is important because it makes certain that none of the cleaning and washing solution can overflow the elevated tank and pass to and injure the vacuum pump. It is therefore an object of the present invention to provide a lower tank which is just large enough so the amount of cleaning and washing solution that can be drawn from it is just enough to fill the milk line and to substantially fill the elevated tank.

The individual milking units will, during the washing operation, be used to connect the lower tank with the milk line; and this is desirable because it permits those milking units to be washed and cleaned at the same time the milk line is washed and cleaned. Specifically, those milking units will be connected to a header which, in turn, is connected to the milk line; and the milking cups of those milking units will be submerged in the cleaning and washing solution in the lower tank. When the pulsator connects the vacuum line to the vacuum pump, the cleaning and washing solution will be drawn through the milking units, through the header, and then through the milk line to the elevated tank. Subsequently, when the pulsator connects the vacuum line to the ambient atmosphere, the cleaning and washing solution will drain back out of the elevated tank, through the milk line, through the header, and then through the milking units to the lower tank. As the cleaning and washing solution is drawn up through the milking units and then is subsequently permitted to drain back through those units, that solution will thoroughly clean those milking units.

The present invention provides small cups that can be telescoped over the milking cups of the milking units during the washing operation. Those small cups have perforated bottoms and partially perforated sides. The largest part of the cleaning and washing solution will be drawn into the milking cups of the milking units through the perforations in the bottoms of those small cups, because the rate at which that cleaning and washing solution can be moved by the reduced pressure in the vacuum line is not unduly rapid. However, the rate at which that cleaning and washing solution drains back out of the milking units is so rapid that all of that cleaning and washing solution can not pass through the perforations in the bottoms of the small cups. Instead, some of that cleaning and washing solution will rise upwardly in those small cups and either pass through the perforations in the sides of those small cups or flow over the top edges of those small cups. In rising upwardly in those small cups, the cleaning and washing solution engages and cleans the exteriors of the milking cups. It is therefore an object of the present invention to provide cups with perforated bottoms and partially perforated sides that can be telescoped over the milking cups of the milking units.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing,

FIG. 1 is a schematic view of the left-hand part of the milking system provided by the present invention, FIG. 2 is a schematic view of the right-hand part of the milking system provided by the present invention, FIG. 3 is a front elevational view of one of the small cups that can be telescoped over the milking cups during the washing and cleaning operation, FIG. 4 is a vertical section through the small cup of FIG. 3, FIG. 5 is a sectional view through one of the T-junctions of the milking line and through a perforated closure for the T-junction, FIG. 6 is the wiring diagram of the milking system of FIGS. 1 and 2, FIG. 7 is a partially broken-away, partially-sectioned plan view of the pulsator provided by the present invention, FIG. 8 is a sectional view through the pulsator of FIG. 7, and it is taken along the plane indicated by the line 8—8 in FIG. 7, FIG. 9 is a view of the right-hand end of the pulsator of FIG. 7 after the housing for the right-hand solenoid has been removed, FIG. 10 is a view of the left-hand end of the removed housing for the right-hand solenoid of the pulsator, FIG. 11 is a schematic view of a control that introduces air into the milking system during the cleaning and washing operation, FIG. 12 is a partially broken-away, generally-schematic plan view of the pulsator of FIG. 7 as that pulsator is connected to two separate vacuum lines, FIG. 13 is a plan view of an encased heating element that can be used with the pulsator of FIG. 7, FIG. 14 is a schematic view of the pulsator of FIG. 7 as it is used solely to control the milking operation, and FIG. 15 is the wiring diagram of the arrangement shown in FIG. 14.

Referring to the drawing in detail, the numeral 50 denotes the milk line of the milking system provided by the present invention. That milk line will preferably be made of glass, stainless steel or some other material that is approved by milk codes. That milk line is made in a number of sections, and most of those sections are interconnected by T-junctions 52. Those T-junctions are made so the alined ports thereof telescope over and accommodate the ends of adjacent sections of the milk line, and so the remaining ports thereof telescope within and accommodate the upper ends of milk hoses 62 which extend downwardly to the individual milking units 60. Each milking unit will be equipped with a shut-off valve 61 or a shut-off clamp for its hose 62. The hoses 62 and the milking units 60 are of standard and usual design and construction.

The numeral 54 denotes the vacuum line of the milking system, and that vacuum line is made of a number of sections which are interconnected by T-junctions 56. Those T-junctions are made so the alined ports thereof telescope over and accommodate the ends of adjacent sections of the vacuum line, and so the remaining ports thereof can be connected to shut-off valves 58. Vacuum hoses 64 have the upper ends thereof connected to nipples at the bottoms of the shut-off valves 58, and those hoses extend to the milking units 60 in the standard and usual way.

The numeral 66 denotes a tank which is disposed above the level of the milk line 50, and that tank has an opening in the bottom thereof. A baffle 68 overlies that opening; and that opening and that baffle will permit liquid to move upwardly through that opening but will force that liquid to move outwardly toward the sides of the tank 66, thereby keeping that liquid from passing upwardly through the tank in an uninterrupted straight line. The tank 66 has a closure 70 and that closure has an opening adjacent the center thereof. The closure 70 is releasably secured to the tank 66 by bolts so that closure can be removed whenever desired. A sealing gasket is provided between the closure 70 and the tank 66 to make the connection between that closure and that tank air-tight.

An L-shaped pipe 72 extends downwardly from the opening in the bottom of the tank 66, and the lower end of that pipe extends toward the left-hand end of the milk line 50. The left-handmost T-junction 52 connects the left-hand end of the milk line 50 with the lower end of the L-shaped pipe 72. If desired, a union could be interposed between the lower end of the L-shaped pipe 72 and a nipple projecting to the left from the left-handmost T-junction 52; and such a union would permit ready separation of the L-shaped pipe 72 from the milk line 50.

A J-shaped pipe 76 is fixedly connected to the opening in the closure 70, and the lower end of that pipe extends downwardly to a union 78. That union is secured to the upper end of a pipe 80 which extends upwardly from a shut-off valve 82; and that shut-off valve is connected to the left-hand end of the vacuum line 54.

The numeral 84 denotes a T-junction which is made a part of the vacuum line; and that T-junction coacts with resilient connector 87 and two short nipples 86 and 89 to connect the vacuum line with one of the ports of the pulsator 96. Another of the ports of that pulsator is connected to a vacuum pump 88 by an L-shaped pipe 90, a resilient connector 92 and another pipe 91, all as indicated by FIG. 1. A pipe 94 extends from the vacuum pump 88 to the milk-collecting tank, not shown; and that milk-collecting tank is normally connected to the right-hand end of the milk line 50 by an L 71, an L-shaped pipe 260 and a union 262. As a result, the vacuum pump 88 creates a reduced pressure which is communicated to the milk line 50 by the milk-collecting tank and which is selectively communicated to the vacuum line 54 by the pulsator 96.

The pulsator 96 has a base 98, and that base has bosses 99 with openings 100 which can accommodate mounting screws or bolts. That base also has three threaded holes 101, which accommodate bolts or screws that serve to releasably secure the valve housing of the pulsator 96 to the base 98.

The numeral 102 denotes a horizontally-directed, internally-threaded recess in the base 98 which opens to one of the sides of that base and which has an upwardly-directed arm adjacent the inner end thereof. A shallow annular recess 111 is provided adjacent the upper end of that upwardly-directed arm; and that annular recess accommodates an O-ring 115. Generally similar horizontally-directed, internally-threaded recesses 104, 106, 108 and 110 are provided in the base 98. The recess 104 opens to the same side of the base 98 to which the recess 102 opens; but the recesses 106, 108 and 110 open to the opposite side of the base 98. The upwardly-directed arm adjacent the inner end of the recess 104 is generally alined with the upwardly-directed arm adjacent the inner end of the recess 102, as indicated by FIG. 7. The upwardly-directed arms adjacent the inner ends of the recesses 106, 108 and 110 are alined with each other, as indicated by FIG. 7. The recesses 106 and 110 perform no useful function in the arrangement shown by FIG. 7; and the outer ends of those recesses are closed and sealed by threaded plugs 130.

As indicated by FIG. 7, it is the pipe 90, that communicates with the vacuum pump 88, that is seated within the recess 102. The nipple 89, which communicates with the vacuum line 54, extends to and is seated within the recess 108. A pipe 132 has one end thereof seated in the recess 104, and the other end of that pipe supports a shut off valve 134. If desired, a silencer or muffler of standard and usual design could be connected to the upper port of that shut off valve.

The base 98 has a recess 141 adjacent the right-hand end thereof, and a socket 142 is mounted in that recess. A generally similar recess, not shown, is provided in the base 98 adjacent the right-hand end of the left-hand solenoid housing 162; and a socket 140 is mounted in that second recess. A hollow chamber, not shown, is provided in the left-hand portion of the base 98, and that chamber communicates with the recess 141 and with the recess for the socket 140. That chamber also communicates with an opening, not shown, in which a fitting 179 for a length of conduit 180 is seated. The length of conduit 180 accommodates wires 182, 184 and 186; and those wires extend through the chamber, in the left-hand portion of the base 98, and are suitably connected to the terminals of the sockets 140 and 142. A plate 103 is removably secured to the left-hand end of the base 98, and that plate constitutes a removable closure for the chamber within the left-hand portion of that base.

The numeral 113 denotes a valve housing which is secured to the base 98 by three screws that extend through vertical passages in that valve housing and seat in the three threaded holes 101 in the base 98. That valve housing has a central recess 112; and a passageway 114 extends between that central recess and the upwardly-directed arm adjacent the inner end of the recess 102, a passageway 116 extends between that central recess and the upwardly-directed arm adjacent the inner end of the recess 104, a passageway 118 extends between that recess and the upwardly-directed arm adjacent the inner end of the recess 106, a passageway 120 extends between that central recess and the upwardly-directed arm adjacent the inner end of the recess 108, and a passageway 122 extends between that central recess and the upwardly-directed arm adjacent the inner end of the recess 110. The passageways 118 and 122 perform no useful function in the arrangement shown by FIG. 7 because the outer ends of the recesses 106 and 110 are closed and sealed by the threaded plugs 130.

A valve element 124 is disposed within the central recess 112, and that valve element is dimensioned to fit snugly within the recess 112 but to be capable of reciprocating relative to that recess. The valve element 124 has two reduced-diameter neck portions 126 and 128, and those neck portions are adjacent both the longitudinal center and the geometric center of that valve element. Inserts 125, of a wear-resistant material such as nylon, are mounted in recesses in the opposite ends of the valve element 124.

The neck portion 128 is long enough so it can place the passageway 114 in communication with the passageway 120 whenever the valve element 124 is in its right-hand position, and the neck portion 126 is long enough so it can place the passageway 116 in communication with the passageway 120 whenver the valve element 124 is in the left-hand position shown by FIG. 7. The valve element 124 has a full diameter portion intermediate the neck portions 126 and 128, and that full diameter portion isolates the passageway 120 from the passageway 114 whenever the valve element 124 is in its left-hand position; and that full diameter portion isolates the passageway 116 from the passageway 120 whenever the valve element 124 is in its right-hand position. As a result, the valve element 124 can, by shifting in the endwise direction, place the nipple 89 in communication with the reduced pressure in the pipe 90 or in communication with the pressure in the pipe 132. The rate at which air can enter the pipe 132, and thus pass through the central recess 112 and enter the pipe 89, will be controlled by the setting of the shut off valve 134. That valve preferably is of the type which can be set in an infinite number of positions intermediate its fully-open and its fully-closed positions and which will remain in any of those intermediate positions until moved to another position.

The valve housing 113 has four bosses 136 projecting axially beyond the ends of that housing. As shown particularly by FIG. 9, two bosses 136 are provided at the right-hand end of the valve housing 113, and two counterpart bosses extend from the left-hand end of that valve housing. Those bosses have flat, horizontally-directed upper faces and have flat, vertically-directed inner faces. The outer faces of those bosses are arcuate, and those outer faces merge into the flat, horizontally-directed bottoms of those bosses. Vertically-directed, internally-threaded openings 138 are provided in the bosses 136, and those openings accommodate the threaded ends of screws or bolts 156.

The numeral 146 denotes a housing for a solenoid 176, and that solenoid has a plunger 152. That solenoid is connected to the prongs of a two-pronged plug 158 by conductors 160. The plunger 152 of the solenoid 176 is guided and confined by a boss 150 on the solenoid housing 146, and that boss holds that plunger in register with the insert 125 in the right-hand end of the valve element 124.

The prongs of the two-pronged plug 158 extend into the recesses of the socket 142 and engages the contacts of that socket. The boss 150, and the conductors 160 are located in a recess 148 in the left-hand end of the solenoid housing 146. The plug 158 is secured to the left-hand end of the solenoid housing 146 immediately adjacent the bottom of the recess 148.

Vertically-directed passages 144 are provided adjacent the left-hand end of the solenoid housing 146, and those passages can be set in alignment with the threaded openings 138 in the bosses 136 at the right-hand end of the valve housing 113. Fasteners 156, in the form of screws or bolts, can extend freely through the passages 144 and seat in the threaded openings 138 in the bosses 136. Those fasteners will releasably secure the solenoid housing 146 to the valve housing 113. The upper ends of the passages 144 are enlarged, as at 154, to accommodate the heads of the fasteners 156.

The solenoid housing 162, which is set adjacent the left-hand end of the valve housing 113, encloses the solenoid 174. That solenoid housing has a recess 164 therein, and that recess accommodates the boss 166 which guides and confines the plunger 168 of the solenoid 174. That boss will hold that plunger in register with the insert in the left-hand end of the valve element 124. The recess 164 also accommodates conductors 172 which connect the solenoid 174 with the prongs of plug 170. Those prongs releasably extend into recesses in the socket 140 and engage the contacts of that socket. The solenoid housing 162 is releasably secured to the valve housing 113 by fasteners, similar to the fasteners 156; and those fasteners will extend through passages, comparable to the passages 144, and seat in threaded openings, comparable to the openings 138, in the bosses 136 at the left-hand end of the valve housing 113. Thus it can be seen that the solenoid housing 146 and 162 are bolted or screwed to the valve housing 113 and that the said valve housing is bolted or screwed to the base 98.

Referring to FIG. 6, the numeral 190 and the numeral 192 denote junctions in the electrical circuit of the milking system of FIGS. 1 and 2. The junction 190 connects a fixed contact 194 of a motor-driven, single pole, double throw switch and the fixed contact 204 of a second motor-driven, single pole, double throw switch to one of the contacts of the socket 140 by a conductor 184. The junction 192 connects the other fixed contact 196 of the first said motor-driven, single pole, double throw switch and the other fixed contact 206 of the second motor-driven, single pole, double throw switch to one of the contacts of the socket 142 by a conductor 182. The movable contact of the first motor-driven, single pole, double throw switch is denoted by the numeral 198; and that contact is selectively shifted into and out of engagement with the fixed contacts 194 and 196 by adjustable members that are rotated by the motor 200. The movable contact of the second motor-driven, single pole, double throw switch is denoted by the numeral 208; and that contact is shifted into and out of engagement with the fixed contacts 204 and 206 by adjustable members that are rotated by the motor 210. The adjustable members can be adjusted to vary the lengths of time the movable contacts 198 and 208 are in engagement with the fixed contacts 194 and 196 and 204 and 206, respectively.

A junction 202 connects the movable contact 198 and one terminal of the motor 200 to one of the fixed contacts 218 of a three pole, double throw switch 214 by means of a conductor 250. A junction 212 connects the movable contact 208 and one terminal of the motor 210 to a fixed contact 224 of the switch 214 by means of the conductor 247. The contacts 216 and 222 of the switch 214 are interconnected by a bridging wire 234, and junctions 236 and 238 and conductor 246 connect that bridging wire with one of the contacts of a female socket 240. That socket is provided for the convenience of the dairyman, and he can use that socket as a convenient source of voltage for any electrically-operated appliances he may use in the milking parlor. The other contact of the socket 240 is connected to the movable contact 230 of the swtich 214 by the conductor 242. The movable contact 228 of the switch 214 selectively engages the fixed contact 216 or the fixed contact 222; and that movable contact is connected to one side of line through jumper 244, a single pole, single throw manually-operated switch 254, and lead 256. The movable contact 230 of the switch 214 is connected to the other side of line by lead 258, and that movable contact selectively engages the fixed contact 218 or the fixed contact 224. The remaining movable contact 232 of the switch 214 selectively engages the fixed contact 220 or the fixed contact 226. The fixed contact 220 of switch 214 is connected to the other terminal of the motor 200 by the conductor 252. The fixed contact 226 of switch 214 is connected to the other terminal of the motor 210 by the conductor 248.

Referring particularly to FIG. 2, the numeral 257 denotes a housing which accommodates the switch 214, the switch 254, the socket 240, the motor 200, and the single pole, double throw switch which it operates. The numeral 259 denotes a housing which accommodates the motor 210 and the single pole, double throw switch which it operates. A section of conduit 261 extends between the housings 257 and 259, and the appropriate conductors extend through that section of conduit.

The L 71, the L-shaped pipe 260 and the union 262 are shown connecting the right-hand end of the milk line 50 to a header 268; and this will be the arrangement whenever the milk line 50 is being washed and cleaned. However, whenever the milk line 50 is being used to transmit milk to the milk-collecting tank, the L-shaped pipe 260 will be rotated about the axis of its vertical arm, and its right hand end will be connected to the milk-collecting tank by the union 262. The L-shaped pipe and the union 262 thus selectively connect the milk line 50 to the milk-collecting tank or to the header 268. That header has a number of short nipples extending downwardly from it, and those nipples can accommodate the upper ends of the hoses 62.

The numeral 274 denotes a tank which can receive a washing and cleaning solution 275, and that tank is disposed below the level of the milk line 50. That tank has a rack or bracket 277 which projects upwardly from it; and that rack or bracket can accommodate and support the various milking units 60 when those milking units are to be washed and cleaned. The rack or bracket 277 permits the milking cups of the milking units 60 to depend downwardly within the tank 274 and to have their lower ends adjacent the bottom of that tank. When the milking units 60 are to be washed and cleaned, the milk hoses 62 thereof will be connected to the nipples 270 of the header 268. The tank 274 has a volumetric capacity that greatly exceeds the volumetric capacity of the milk line 50; and thus that tank can hold a quantity of cleaning and washing solution 275 which has a volumetric capacity that greatly exceeds the volumetric capacity of the milk line 50.

The numeral 276 denotes a small cup which has perforations 278 in the wall and bottom thereof. That cup is dimensioned so it can telescope upwardly over the lower end of any of the milking cups of the milking units 60. The engagement between the cup 276 and a milking cup of a milking unit 60 is snug enough to keep the cup 276 from falling away from that milking cup but is loose enough to permit cleaning and washing solution to pass between the inner surface of cup 276 and the outer surface of the milking cup. As indicated particularly by FIGS. 3 and 4 the perforations 278 in the wall of the cup 276 are spaced an appreciable distance above the level of the bottom of that cup.

Referring to FIG. 5, the numeral 280 denotes a cup-like cap of rubber or elastomeric plastic, and that cap has an opening 282 in the bottom thereof. The normal internal diameter of the cap 280 is smaller than the outer diameter of the stem of any of the T-junctions 52. Consequently, to telescope the cap 280 into the position shown by FIG. 5, the wall of that cap must be extended slightly. As a result, the restoring forces in the wall of that cap will tend to hold that cap in position on the stem of a T-junction 52 and prevent accidental separation from that T-junction.

*Milking Operation*

To prepare the control provided by the present invention for the milking operation, the milk hoses 62 of the milking units 60 will be connected to the T-junctions 52, and the vacuum hoses of those milking units will be connected to the bottom ports of the valves 58. The union 262 will be connected to the milk-collecting tank, not shown, and the valve 82 will be closed. The vacuum pump 88 will then be started, and thereupon the handle of switch 214 will be shifted to its upper position and the switch 254 will be closed. At this time the valves 58 and 61 can be opened and the milking cups of the milking units 60 can be attached to the cows.

If the dairyman intends to milk cows that are "hard milkers," he should set the valve 134 so it is partly closed; but if he intends to milk cows that are "easy milkers," he should set the valve 132 so it is fully open. The extent to which the valve 134 should be closed is readily determined by the dairyman after he initiates the milking operation. Specifically, once the milking operation has been started, the dairyman can check the vacuum gage at the vacuum pump 88 and progressively close the valve 134 until the desired range of reduced pressures is shown by that gage.

Whenever the dairyman shifts the handle of the switch 214 into its upper position and closes the switch 254, current will flow from the lead 256 through the now-closed switch 254 to the movable contact 232 of switch 214, through that movable contact, past fixed contact 220, through conductor 252 to the motor 200, past the junction 202, through conductor 250, past fixed contact 218, and then through the movable contact 230 to the lead 258. As a result, the motor 200 will start rotating and will alternately shift the movable contact 198 into and out of engagement with the fixed contacts 194 and 196. Current will also flow from the connecting lead 256 through switch 254, through bridging wire 244, through movable contact 228, past fixed contact 216, through bridging wire 234, past junction 236, through conductor 246, past junction 238, and through conductor 186 to junction 187. Thereafter, depending upon the position of the movable contact 198, current will flow through solenoid 174 to fixed contact 194 and then back to the lead 258 or will flow through the solenoid 176 to the fixed contact 196 and then back to the lead 258. Specifically, when the movable contact 198 is in engagement with the fixed contact 194, current will flow from junction 187 through one of the contacts of socket 140, through one of the prongs of plug 170, through one of the conductors 172, through solenoid 174, through the other conductor 172, through the other prong of plug 170, through the other contact of socket 140, through conductor 184, past junction 190, through contacts 194 and 198, past junction 202, through conductor 250, and then past the contacts 218 and 230 to the lead 258. When the movable contact 198 is in engagement with the fixed contact 196, current will flow from junction 187 through one of the contacts of socket 142, through one of the prongs of plug 158, through one of the conductors 160, through solenoid 176, through the other conductor 160, through the other prong of plug 158, through the other contact of socket 142, through conductor 182, past junction 192, past contacts 196 and 198, past junction 202, through conductor 250, and then past contacts 218 and 230 to the lead 258. This means that whenever the motor 200 causes the movable contact 198 to move into engagement with the fixed contact 194, the solenoid 174 will be energized and will remain energized until the motor 200 shifts the movable contact 198 into engagement with the fixed contact 196; and thereafter the solenoid 176 will be energized and will remain energized until the motor 200 again shifts the movable contact 198 into engagement with the fixed contact 194.

When the solenoid 176 is energized, it causes its plunger 152 to move to the left and thereby shift the valve element 124 to the left-hand position shown by FIG. 7. At such time, the pipe 89 will be in communication with the pressure in the pipe 132; and that latter pipe will be at a pressure close to atmospheric pressure because the valve 134 opens directly to the ambient atmosphere. This means that the pressure in the vacuum pipe 54 will be able to approach atmospheric pressure.

However, when the solenoid 174 is energized, that solenoid will cause its plunger 168 to shift the valve element 124 to the right and will place the pipe 89 in communication with the reduced pressure in the pipe 90. As a result, the pressure in the vacuum line 54 will fall, and a reduced pressure will be created in the vacuum hose of each milking unit 60. Shortly thereafter, the solenoid 176 will be reenergized, as by the shifting of movable contact 198 out of engagement with fixed contact 194 and into engagement with fixed contact 196; and as a result the valve element 124 will be shifted back to the position shown in FIG. 7. At such time, air will pass inwardly through the valve 134, and through the pipe 132, through the central recess 112 of the pulsator 96 and then into the pipe 89. That air will permit the pressure within the vacuum line 54 and within the vacuum hoses 64 to rise once again. The extent to which the pressure within the vacuum line 54 and within the vacuum hoses 64 will rise will be dependent upon the setting of the valve 134 and upon the length of time the movable contact 198 remains in engagement with the fixed contact 196. Successive shifts of the movable contact 198 between its two fixed contacts will cause successive falls and rises in the pressure within the vacuum line 54 and the vacuum hoses 64. Those falls and rises will effect the desired milking of cows by the milking units 60.

The pressure ranges that will be used will be those which are customarily used in the milking of cows. Those pressure ranges are well known to those skilled in the art, but they are established with unparalleled ease and speed. All the dairyman need do to change the pressure range is to change the setting of valve 134.

As long as the switch 214 remains in its upper position, the motor 200 will continue to time the alternate connection of pipe 89 to pipe 90 or pipe 132. In the event all of the milking units 60 are not to be used, one or more of those milking units can be rendered inactive by closing the appropriate valve 58 and the appropriate valve 61.

The duration of each period during which the pipe 89 is connected to the vacuum pump and the duration of each period when that pipe is connected to the atmosphere adjacent the valve 134 are precisely controlled by the durations of the periods when the movable contact 198 is in engagement with the fixed contact 194 and with the fixed contact 196, respectively. The motor 200 will be a synchronous motor; and the adjustable members that are rotated by that motor to shift the movable contact 198 will be capable of precise settings. As a result the dairyman can precisely regulate the durations of the periods when the vacuum pipe 54 is connected to the vacuum pump 88 and to the pipe 132.

The vacuum pump 88 will reduce the pressure within the milk-collecting tank, not shown; and that reduced pressure will cause milk to pass from the milking units 60, through the hoses 62, through the T-junctions 52, through the milk line 50, past L 71 and pipe 260 and through the union 262 to that milk-collecting tank. The milking operation will be continued until all of the cows have been milked.

*Washing and Cleaning Operation*

To clean and wash the milk line 50 and the milking units 60, the dairyman will open the switch 254. Then he will disconnect the vacuum hoses 64 of the milking units 60 from the valves 58 and close those valves. Also, the dairyman will disconnect the milk hoses 62 from the T-junctions 52 and telescope caps 280 over the open ports of those T-junctions. The dairyman will then connect the milk hoses 62 of the various milking units 60 to the nipples 270 on the header 268 and he will telescope the small cups 276 over the lower ends of the milking cups of the milking units 60. Thereafter, he will set the milking units 60 on the rack 277 of the tank 274 so the milking cups and the small cups 276 telescoped thereon depend downwardly into that tank. That tank will have a cleaning and washing solution 275 in it as indicated by FIG. 2. The dairyman will then disconnect the union 262 from the milk-collecting tank, not shown, rotate the L-shaped pipe 260 about the axis of its vertical arm until the union 262 is adjacent the header 268, and then connect that union to that header. Further, the dairyman will open the valve 82 intermediate the vacuum line 54 and the tank 66.

One of the caps 280 is shown by FIG. 5, and that cap has an opening 282 in the bottom thereof. That opening is small enough to prevent the ready flow of liquid through it but is large enough to let air bubble through it.

The dairyman will also shift the valve 134 toward open position. In doing so, he will facilitate rapid draining of the milk line 50 during washing and cleaning of that milk line.

Thereupon, the dairyman will shift the switch 214 until its movable contacts 228, 230 and 232 engage the fixed contacts 222, 224 and 226, respectively; and then he will close the switch 254. Thereupon, current will flow from the lead 256 through the now-closed switch 254, through movable contact 232, past fixed contact 226, through conductor 248, through motor 210, past junction 212, through conductor 247, and then past the contacts 224 and 230 to the lead 258. The flow of this current energizes the motor 210 and causes that motor to recurrently shift the movable contact 208 into and out of engagement with the fixed contacts 204 and 206. The frequency with which the motor 210 shifts the movable contact 208 is much lower than the frequency with which the motor 200 shifted the movable contact 198 into and out of engagement with the fixed contacts 194 and 196.

Current will also flow from the lead 256 through the switch 254, through bridging wire 244, through movable contact 228, past contact 222, past junction 236, through conductor 246, past junction 238 and through the conductor 186 to the junction 187. Thereafter, depending upon the position of the movable contact 208, current will flow through solenoid 174 or solenoid 176. Specifically, when the movable contact 208 is in engagement with the fixed contact 204, current will flow from junction 187 through one of the contacts of socket 140, through one of the prongs of plug 170, through one of the conductors 172, through solenoid 174, through the other conductor 172, through the other prong of plug 170, through the other contact of socket 140, through conductor 184, past junction 190, past contacts 204 and 208, past junction 212, through conductor 247, and then through the contacts 224 and 230 to the lead 258. When the movable contact 208 is in engagement with the fixed contact 206, current will flow from junction 187 through one of the contacts of socket 142, through one of the prongs of plug 158, through one of the conductors 160, through solenoid 176, through the other conductor 160, through the other prong of plug 158, through the other contact of socket 142, through conductor 182, past junction 192, through contacts 206 and 208, past junction 212, through conductor 247, and then through contacts 224 and 230 to the lead 258.

This means that whenever the motor 210 causes the movable contact 208 to move into engagement with the fixed contact 204, the solenoid 174 will cause its plunger 168 to shift the valve element 124 to the right and thereby place the pipe 89 in communication with the reduced pressure within pipe 90. As a result, the pressures within the vacuum line 54, within the pipe 80, within the pipe 76, and within the tank 66 will be reduced. Such reductions in pressure will enable the atmospheric pressure, acting upon the surface of the cleaning and washing solution 275 in the tank 274, to force that cleaning and washing solution into and through the milking cups of the milking units 60 and into and through the milk line 50. That cleaning and washing solution will largely pass through the perforations 278 in the bottoms of the cups 276, but some of that cleaning and washing solution can pass inwardly through the perforations 278 in the walls of those cups and can pass downwardly through the open tops of those cups. In passing through the perforations 278 in the walls of the cups 276 and in passing downwardly through those cups, the cleaning and washing solution will engage and wash the exteriors of the milking cups of the milking units 60. In passing upwardly through the milking cups of the milking units 60, that cleaning and washing solution will remove residual milk and will fully clean the interiors of those milking cups. In passing through the milk hoses 62 and through the milk line 50, the cleaning and washing solution will remove residual milk and will fully clean those hoses and that line.

The cleaning and washing solution 275 will pass upwardly through the nipples 270, through the header 268, through pipe 260, past L 71, through milk line 50, past T-junctions 52, and upwardly through pipe 72 into the upper tank 66. While the cleaning and washing solution 275 is being drawn up into the milk line 50, the reduced pressure within that line will cause bubbles of air to be drawn up through the openings 282 in the cup-like caps 280 on the lower ports of the T-shaped junctions 52. Those bubbles of air will agitate the washing and cleaning solution that is in those T-shaped junctions. That agitation is desirable because it enhances the cleaning and washing action of that solution.

The size of the tank 274 is such that the amount of cleaning and washing solution 275 which can be placed in that tank can not be great enough to fill the line 50 and also fill the tank 66 to overflowing. As a result, the cleaning and washing solution 275 can not get into the pipes 76 and 80 and thus enter the vacuum line 54. The baffle 68 is provided in the tank 66 to keep the cleaning and washing solution 275 from moving straight up through the tank 66 in an uninterrupted vertical path. Instead, that baffle forces the cleaning and washing solution 275 to change directions and move outwardly toward the sides of the tank 66; and in doing so, that baffle helps keep the cleaning and washing solution 275 out of the vacuum line 54. The present invention additionally keeps cleaning and washing solution from getting into the vacuum line 54 by so limiting the time during which the solenoid 174 is energized that there is not enough time to fill the tank 66 to overflowing even if the dairyman were to keep on adding cleaning and washing solution to the lower tank. As a result, the present invention keeps slugs of cleaning and washing solution from getting into the vacuum line 54 and thereby keeps the vacuum pump 83 from being injured.

At the end of a predetermined period, which is established by the rate of rotation of the motor 210 and by the setting of the adjustable members that rotate with that motor, the movable contact 208 will be moved into engagement with the fixed contact 206. Thereupon, solenoid 176 will be energized and will shift the valve element 124 into the position shown by FIG. 7. Air will then pass inwardly through valve 134, through pipe 132, through recess 112, through pipe 89, through connector 87, through pipe 86, and through T-junction 84 to the vacuum line 54. That air will permit the pressure in the tank 66 to increase, and the cleaning and washing solution 275 will drain back out of the tank 66, out of the pipe 72, and out of the milk line 50. As that cleaning and washing solution passes out of the milk line 50, it will enter the cups 276 so rapidly that all of it can not pass through the openings 278 in the bottoms of the cups 276. Consequently, a good deal of that cleaning and washing solution will have to rise upwardly within the cups 276 and either flow over the tops of those cups or flow outwardly through the openings 278 in the walls of those cups. The upward movement of the cleaning and washing solution 275 through the cups 276 will provide further washing of the exteriors of the milking cups of the milking units 60.

The period of time during which the movable contact 208 remains in engagement with the fixed contact 206 will be long enough to enable substantially all of the cleaning and washing solution 275 to drain out of the milk line 50 and out of the milk hoses 62 of the milking units 60. Thereafter, the motor 210 will cause the movable contact 208 to shift into engagement with the fixed contact 204 for a further cleaning and washing cycle. The number of recurrent cleaning and washing cycles that will be employed will be determined by local conditions and requirements.

Each time the cleaning and washing solution 275 is shifted into the upper tank 66, there is an opportunity for the residual milk that is picked up in the milk line 50 and in the milk hoses 62 to distribute itself substantially uniformly throughout that cleaning and washing solution, and thereby avoid an undue concentration of that milk in just a limited portion of the cleaning and washing solution. Again, whenever the cleaning and washing solution is collected in the tank 274, there is an opportunity for the milk picked up in the milk line 50 and in the milk hoses 62 to distribute itself substantially uniformly throughout that cleaning and washing solution. In this way, each and every portion of the cleaning and washing solution is given a full opportunity to retain its cleaning and washing action.

The raising of the cleaning and washing solution 275 up into the milk line 50 and the subsequent draining of that cleaning and washing solution back into the tank 274 is completely automatic, and it frees the dairyman so he can attend to other chores. Thus, the dairyman will be able to clean the milk-collecting tank while the pulsator 96 is controlling the cleaning and washing of the milk line 50 and of the milking units 60.

Where desired, charges of air can be intermittently introduced into the milk line 50 during the cleaning and washing operation; and one arrangement that accomplishes this result is shown in FIG. 11. A pressure-operated pulsator 290 is connected to the header 268 by a nipple 292; and the pulsator will selectively open and close a port through which air can enter the header 268. The port in the pulsator 290 will be closed whenever the pipe 89 is connected to the pipe 132 and the cleaning and washing solution 275 is draining back to the tank 274; but that port will recurrently open and close whenever the pipe 89 is connected to the pipe 90 and the cleaning and washing solution is being drawn up into the milk line 50. That opening and closing of that port will be due to the reduced pressure within the header 268; and the pulsator 290 will have a much shorter time cycle than does the single pole, double throw switch operated by the motor 210. As a result, a series of charges of air will be introduced into the cleaning and washing solution 275 as that cleaning and washing solution is moved into and through the milk line 50.

Those charges of air will enable the cleaning and washing solution 275 in the milk line 50 to recurrently spurt toward the upper tank 66, and thus produce violent agitation and turbulence within the milk line 50. However, when the port of the pressure-operated pulsator is closed, the cleaning and washing solution 275 will pass upwardly into and through the milk line 50 at a moderate rate. The recurrent charges of air which are introduced into the milk line 50 by the pressure-operated pulsator thus facilitate full and effective cleaning and washing of the milk line 50.

If desired, a small, continuously-open vent could be used in place of the pressure-operated pulsator. That vent would permit air to bubble into the header 268 continuously whenever the cleaning and washing solution 275 was being drawn into and through the milk line 50.

During the milking operation, the pulsator 96 alternately connected the pipe 89 to the pipe 90 and to the pipe 132; and it alternately connected the pipe 89 to those two pipes for periods of predetermined durations. Similarly, during the washing and cleaning operation, that pulsator alternately connected the pipe 89 to the pipe 90 or 132; and it alternately connected the pipe 89 to those two pipes for periods of longer, predetermined durations. Consequently, that pulsator provides full and precise control of both the milking operation and the washing and cleaning operation.

If desired, the pulsator provided by the present invention can be used to supplant the individual pressure-operated pulsators which are mounted on the individual milking units of a milking system. This is easily done by connecting that pulsator intermediate the vacuum line and the vacuum pump of that milking system. Such supplanting is desirable because it provides electrically-controlled timing of the milking operation; and such timing is more accurate than timing afforded by pressure-operated pulsators, because electrically-controlled timing is not affected by variations in ambient pressure whereas pressure-controlled timing is affected by variations in ambient pressure. Furthermore, such supplanting makes it possible to quickly and precisely increase the vacuum whenever "hard milkers" are to be milked. Consequently, the pulsator 96 provided by the present invention is usable in milking systems even though those systems do not have the tank 66 or the tank 274.

The pulsator 96 can also be used to control the operation of two separate milking systems. Thus, FIG. 12 shows the pulsator 96 connected to a vacuum line 310 and to a second vacuum line 312. That pulsator will alternately connect vacuum line 310 to pipe 314 or to pipe 90 and will alternately connect vacuum line 312 to pipe 90 or pipe 316. Specifically, when one of the solenoids of pulsator 96 in FIG. 12 is energized, the valve element of that pulsator will interconnect pipe 310 with pipe 314 while also connecting pipe 312 with pipe 90. When the other solenoid of that pulsator is energized, the valve element of that pulsator will interconnect pipe 310 with pipe 90 while also connecting pipe 312 with pipe 316. In this way, that pulsator will always connect one of the vacuum lines to the vacuum pump by means of pipe 90 while connecting the other vacuum line to the ambient atmosphere.

The pipe 314 is equipped with a valve 318, and a muffler or silencer can be connected to the outlet port of that valve. The pipe 316 is equipped with a valve 320, and a muffler or silencer can be connected to the outlet port of that valve. Appropriate adjustments in the settings of the valves 318 and 320 will determine the vacuum ranges in the vacuum lines 310 and 312.

FIG. 13 shows an encased electric heating element 324. That heating element has threads 326 which are complementary to the threads of recesses 106 or 110 of the pulsator 96 in FIG. 7. Leads 328 are provided for the heating element 324, and those leads can be connected to a suitable source of current by means of a thermostat. That heating element can be disposed directly in the recess 106 or directly in the recess 110; and that heater will act to close and seal that recess. That heater will supply the heat needed to keep the valve element 124 from freezing to position during cold weather.

FIG. 14 shows the pulsator 96 as it appears when used in a milking system that does not have the tanks 66 and 274. That pulsator has a pipe 390 which is connected to a vacuum pump 388, has a pipe 389 which can be connected to the vacuum line of the milking system, and has a pipe 392 which is connected to the ambient atmosphere by a shut off valve 394. That pulsator will, during the milking operation, alternately connect the pipe 389 to the pipe 390 or to the pipe 392. In doing so, that pulsator will provide alternate falls and rises in the pressure within the vacuum line of the milking system.

An electrical box 396 is physically secured to the pulsator 96 by a section of conduit 398. That box contains a single pole, single throw, manually-operated switch 400 and a motor-driven interrupter. The motor of that interrupter is denoted by the numeral 402, the movable contact of that interrupter is denoted by the numeral 408, and the fixed contacts of that interrupter are denoted by the numerals 404 and 406 in FIG. 15. The fixed contact 404 is connected to one terminal of solenoid 174 and the fixed contact 406 is connected to one terminal of the solenoid 176.

When the switch 400 is closed, the motor 402 will alternately place the movable contact 408 in engagement with the fixed contacts 404 and 406. As a result, the pulsator 96 will alternately connect the pipe 389 to the pipes 390 and 392, thereby providing the desired falls and rises in the pressure within the vacuum line of the milking system. The durations of those falls and rises can be determined by the settings of the adjustable members of the motor-driven interrupter.

Whereas the drawing and accompanying description have shown and described a preferred embodiment of the present invention, it should be apparent to those skilled in the art that various changes may be made in the form of the invention without affecting the scope thereof.

What we claim is:

1. In a milking system, a vacuum line, a vacuum pump, a pulsator having one port thereof connected to said vacuum line, having a second port thereof connected to said vacuum pump, having a third port thereof connected to the ambient atmosphere, having a valve element that can be shifted in one direction to interconnect said one and said second ports and thereby connect said vacuum line with said vacuum pump and that can be shifted in the opposite direction to interconnect said one and said third ports and thereby connect said vacuum line with said ambient atmosphere, having an electromagnetic coil that can be energized to shift said valve element in said one direction, and having a second electromagnetic coil that can be energized to shift said valve element in said opposite direction, an electric timer that can alternately energize the first said and said second electromagnetic coils of said pulsator and can thereby alternately connect said vacuum line with said vacuum pump or with said ambient atmosphere, and a second electric timer that can alternately energize the first said and said second electromagnetic coils of said pulsator and can thereby alternately connect said vacuum line with said vacuum pump or with said ambient atmosphere, said second electric timer having a time cycle that is longer than the time cycle of the first said electric timer, the first said electric timer having a motor-driven single pole, double throw switch, said second timer having a motor-driven single pole, double throw switch.

2. In a milking system, a vacuum line, a vacuum pump, a pulsator having one port thereof connected to said vacuum line, having a second port thereof connected to said vacuum pump, having a third port thereof connected to the ambient atmosphere, having a valve element that can be shifted in one direction to interconnect said one and said second ports and thereby connect said vacuum line with said vacuum pump and that can be shifted in the opposite direction to interconnect said one and said third ports and thereby connect said vacuum line with said ambient atmosphere, having an electromagnetic coil that can be energized to shift said valve element in said one direction, and having a second electromagnetic coil that can be energized to shift said valve element in said opposite direction, an electric timer that can alternately energize the first said and said second electromagnetic coils of said pulsator and can thereby alternately connect said vacuum line with said vacuum pump or with said ambient atmosphere, and a second electric timer that can alternately energize the first said and said second electromagnetic coils of said pulsator and can thereby alternately connect said vacuum line with said vacuum pump or with said ambient atmosphere, said second electric timer having a time cycle that is longer than the time cycle of the first said electric timer.

3. In a milking system, a vacuum line, a vacuum pump, and a pulsator having one port thereof connected to said vacuum line, having a second port thereof connected to said vacuum pump, having a third port thereof connected to the ambient atmosphere, having a valve element that can be shifted in one direction to interconnect said one and said second ports and thereby connect said vacuum line with said vacuum pump and that can be shifted in the opposite direction to interconnect said one and said third ports and thereby connect said vacuum line with said ambient atmosphere, having an electromagnetic coil that can be energized to shift said valve element in said one direction, and having a second electromagnetic coil that can be energized to shift said valve element in said opposite direction, said valve element being adapted to remain in position to interconnect said one and said second ports until said second electromagnetic coil is energized, said valve element being adapted to remain in position to interconnect said one and said third ports until the first said electromagnetic coil is energized.

4. In a milking system, a vacuum line, a vacuum pump, a manually adjustable shut off valve, and a pulsator having one port thereof connected to said vacuum line, having a second port thereof connected to said vacuum pump, having a third port thereof connected to one port of said manually adjustable shut off valve, having a valve element that can be shifted in one direction to interconnect said one and said second ports and thereby connect said vacuum line with said vacuum pump and that can be shifted in the opposite direction to interconnect said one and said third ports and thereby connect said vacuum line with said one port of said manually adjustable shut off valve, having an electromagnetic coil that can be energized to shift said valve element in said one direction, and having a second electromagnetic coil that can be energized to shift said valve element in said opposite direction, the other port of said manually adjustable shut off valve communicating with the ambient atmosphere, said manually adjustable shut off valve being adjustable to vary the range of pressures within said vacuum line.

5. In a milking system, a vacuum line, a vacuum pump, a pulsator that selectively connects said vacuum line to said vacuum pump or to the ambient atmosphere, said pulsator being electrically-actuated, and a plurality of electric timers that can be selectively connected to said pulsator to provide electrical actuation of said pulsator, one of said timers having a time cycle that is longer than the time cycle of another of said timers, whereby said timers and said pulsator can provide reduced pressures of different duration in said vacuum line.

6. In a milking system, a milk line, a vacuum line, connectors in said vacuum line which can receive the vacuum hoses of milking units during the milking cycles of said milking system and thereby coact with said pulsator to place said milking units in communication with the atmosphere in said vacuum line, a vacuum pump, a pulsator that selectively connects said vacuum line to said vacuum pump or to the ambient atmosphere, said pulsator being adapted to recurrently connect said connectors in said vacuum line to said vacuum pump during said milking cycles of said milking system and thereby recurrently enable said vacuum pump to recurrently reduce the pressures within said vacuum hoses of said milking units, a container for cleaning solution that is connectable to said milk line, and a tank that is connectable intermediate said milk line and said vacuum line during the washing cycles of said milking system, to enable said pulsator and a reduced pressure in said vaccum line to create a reduced pressure in said tank and in said milk line, said reduced pressure in said tank and in said milk line drawing said cleaning solution into said milk line to clean said milk line, said pulsator subsequently connecting said vacuum line to said ambient atmosphere to permit said cleaning solution to drain back to said container, whereby said pulsator controls the pressures within said vacuum line during the milking and the washing cycles of said milking system.

7. In a milking system, a milk line, a vacuum line, a vacuum pump, a pulsator that selectively connects said vacuum line to said vacuum pump or to the ambient atmosphere, a container for cleaning solution that is connectable to said milk line during the cleaning of said milk line but that is separated from said milk line during the milking cycle of said milking system, a tank that is connectable intermediate said milk line and said vacuum line during the cleaning of said milk line but that is separated from said vacuum line during the milking cycle of said milking system, a timer that actuates said pulsator during the milking cycle of said milking system, and a second timer that actuates said pulsator during the cleaning of said milk line, said tank being connectable intermediate said milk line and said vacuum line to enable a reduced pressure in said vacuum line to create a reduced pressure in said tank and in said milk line, said reduced pressure in said tank and in said milk line drawing said cleaning solution into said milk line to clean said milk line, said second timer having a longer cycle than the first said timer, whereby part of said cleaning solution can pass all the way through said milk line and enter said tank and whereby substantially all of said cleaning solution can drain back to said container.

8. In a milking system, a milk line, a vacuum line, connectors in said vacuum line which can receive the vacuum hoses of milking units during the milking cycles of said milking system and thereby coact with said pulsator to place said milking units in communication with the atmosphere in said vacuum line, a vacuum pump, a pulsator that selectively connects said vacuum line to said vacuum pump or to the ambient atmosphere, said pulsator being adapted to recurrently connect said connectors in said vacuum line to said vacuum pump during said milking cycles of said milking system and thereby recurrently enable said vacuum pump to recurrently reduce the pressures within said vacuum hoses of said milking units, a container for cleaning solution that is connectable to said milk line, and a tank that is connectable intermediate said milk line and said vacuum line during the washing cycles of said milking system to enable said pulsator and a reduced pressure in said vacuum line to create a reduced pressure in said tank and in said milk line, said reduced pressure in said tank and in said milk line drawing said cleaning solution into said milk line to clean said milk line, said pulsator subsequently connecting said vacuum line to said ambient atmosphere to permit said cleaning solution to drain back to said container, whereby said pulsator controls the pressures within said vacuum line during the milking and the washing cycles of said milking system, said tank being located above the level of said milk line, said container being located below the level of said milk line.

9. In a milking system, a milk line, a vacuum line, connectors in said vacuum line which can receive the vacuum hoses of milking units during the milking cycles of said milking system and thereby coact with said pulsator to place said milking units in communication with the atmosphere in said vacuum line, a vacuum pump, a pulsator that selectively connects said vacuum line to said vacuum pump or to the ambient atmosphere, said pulsator being adapted to recurrently connect said connectors in said vacuum line to said vacuum pump during said milking cycles of said milking system and thereby recurrently enable said vacuum pump to recurrently reduce the pressures within said vacuum hoses of said milking units, a container for cleaning solution that is connectable to said milk line adjacent one end of said milk line, and a tank that is connectable to said milk line adjacent the other end of said milk line, said tank being connectable to said vacuum line during the washing cycles of said milking system to enable a reduced pressure in said vacuum line to create a reduced pressure in said tank and in said milk line, said reduced pressure in said tank and in said milk line drawing said cleaning solution into said milk line to clean said milk line, part of said cleaning solution passing through said milk line and entering said tank, said pulsator subsequently connecting said vacuum line to said ambient atmosphere to permit said cleaning solution to drain back to said container, whereby said pulsator controls the pressures within said vacuum line during the milking and the washing cycles of said milking system.

10. In a milking system, a milk line, a vacuum line, connectors in said vacuum line which can receive the vacuum hoses of milking units during the milking cycles of said milking system and thereby coact with said pulsator to place said milking units in communication with the atmosphere in said vacuum line, a vacuum pump, a pulsator that selectively connects said vacuum line to said vacuum pump or to the ambient atmosphere, said pulsator being adapted to recurrently connect said connectors in said vacuum line to said vacuum pump during said milking cycles of said milking system and thereby recurrently enable said vacuum pump to recurrently reduce the pressures within said vacuum hoses of said milking units, a container for cleaning solution that is connectable to said milk line adjacent one end of said milk line, and a tank that is connectable to said milk line adjacent the other end of said milk line, said tank being connectable to said vacuum line to enable a reduced pressure in said vacuum line to create a reduced pressure in said tank and in said milk line, said reduced pressure in said tank and in said milk line drawing said cleaning solution into said milk line during the washing cycles of said milking system to clean said milk line, part of said cleaning solution passing through said milk line and entering said tank, said pulsator subsequently connecting said vacuum line to said ambient atmosphere to permit said cleaning solution to drain back to said container, whereby said pulsator controls the pressures within said vacuum line during the milking and the washing cycles of said milking system, said tank having a volumetric capacity that greatly exceeds the volumetric capacity of said milk line whereby the greatest part of said cleaning solution passes through said milk line and enters said tank.

11. In a milking system, a milk line, a vacuum line, connectors in said vacuum line which can receive the vacuum hoses of milking units during the milking cycles of said milking system and thereby coact with said pulsator to place said milking units in communication with the atmosphere in said vacuum line, a vacuum pump, a pulsator that selectively connects said vacuum line to said vacuum pump or to the ambient atmosphere, said pulsator being adapted to recurrently connect said connectors in said vacuum line to said vacuum pump during said milking cycles of said milking system and thereby recurrently enable said vacuum pump to recurrently reduce the pressures within said vacuum hoses of said milking units, a container for cleaning solution that is connectable to said milk line adjacent one end of said milk line, and a tank that is connectable to said milk line adjacent the other end of said milk line, said tank being connectable to said vacuum line to enable a reduced pressure in said vacuum line to create a reduced pressure in said tank and in said milk line, said reduced pressure in said tank and in said milk line drawing said cleaning solution into said milk line during the washing cycles of said milking system to clean said milk line, part of said cleaning solution passing through said milk line and entering said tank, said pulsator subsequently connecting said vacuum line to said ambient atmosphere to permit said cleaning solution to drain back to said container, whereby said pulsator controls the pressures within said vacuum line during the milking and the washing cycles of said milking system, said container having a volumetric capacity that greatly exceeds the volumetric capacity of said milk line, said container holding said cleaning solution after said cleaning solution has been drawn into said milk line and has subsequently drained back to said container and thereby enabling residual milk picked up by said cleaning solution to distribute itself through said cleaning solution.

12. In a milking system, a milk line, a vacuum line, connectors in said vacuum line which can receive the vacuum hoses of milking units during the milking cycles of said milking system and thereby coact with said pulsator to place said milking units in communication with the atmosphere in said vacuum line, a vacuum pump, a pulsator that selectively connects said vacuum line to said vacuum pump or to the ambient atmosphere, said pulsator being adapted to recurrently connect said connectors in said vacuum line to said vacuum pump during said milking cycles of said milking system and thereby recurrently enable said vacuum pump to recurrently reduce the pressures within said vacuum hoses of said milking units, a container for cleaning solution that is connectable to said milk line, and a tank that is connectable intermediate said milk line and said vacuum line during the washing cycles of said milking system to enable a reduced pressure in said vacuum line to create a reduced pressure in said tank and in said milk line, said reduced pressure in said tank and in said milk line drawing said cleaning solution into said milk line to clean said milk line, said pulsator subsequently connecting said vacuum line to said ambient atmosphere to permit said cleaning solution to drain back to said container, whereby said pulsator controls the pressures within said vacuum line during the milking and the washing cycles of said milking system, said tank preventing any of said cleaning solution from passing from said milk line to said vacuum line and thereby keeping slugs of cleaning solution from passing to said vacuum pump.

13. In a milking system, a milk line, a vacuum pump, a vacuum line, said vacuum line being isolated from said milk line during the milking cycles of said milking system, a connector that places said vacuum line in communication with said milk line during the cleaning cycles of said milking system to reduce the pressure in said milk line during said cleaning cycles, a pulsator that selectively connects said vacuum line to said vacuum pump or to the ambient atmosphere both during said milking cycles and during said cleaning cycles, a timer that actuates said pulsator during said milking cycles, and a second timer that actuates said pulsator during said cleaning cycles, said second timer having a time cycle that is longer than the time cycle of the first said timer.

14. In a milking system, a milk line, a vacuum line, connectors in said vacuum line which can receive the vacuum hoses of milking units during the milking cycles of said milking system and thereby coact with said pulsator to place said milking units in communication with the atmosphere in said vacuum line, a vacuum pump, a pulsator that selectively connects said vacuum line to said vacuum pump or to the ambient atmosphere, said pulsator being adapted to recurrently connect said connectors in said vacuum line to said vacuum pump during said milking cycles of said milking system and thereby recurrently enable said vacuum pump to recurrently reduce the pressures within said vacuum hoses of said milking units, a container for cleaning solution that is connectable to said milk line, and a tank that is connectable intermediate said milk line and said vacuum line during the washing cycles of said milking system to enable a reduced pressure in said vacuum line to create a reduced pressure in said tank and in said milk line, said reduced pressure in said tank and in said milk line drawing said cleaning solution into said milk line to clean said milk line, said pulsator subsequently connecting said vacuum line to said ambient atmosphere to permit said cleaning solution to drain back to said container, whereby said pulsator controls the pressures within said vacuum line during the milking and washing cycles of said milking system, said container being adjacent that end of said milk line which is normally connected to the milk-collecting tank of said milking sys- References Cited in the file of this patent

UNITED STATES PATENTS

| | | |
|---|---|---|
| 1,106,231 | Marshall | Aug. 4, 1914 |
| 1,452,600 | Hapgood | Apr. 24, 1923 |
| 1,613,185 | Mitchell | Jan. 4, 1927 |
| 2,110,758 | Daniels | Mar. 8, 1938 |
| 2,201,528 | Freng | May 21, 1940 |
| 2,233,852 | Schmitt | Mar. 4, 1941 |
| 2,240,364 | Kimball | Apr. 29, 1941 |
| 2,252,125 | Hauser | Aug. 12, 1941 |
| 2,261,364 | Grove | Nov. 4, 1941 |
| 2,434,586 | Reynolds | Jan. 13, 1948 |
| 2,438,844 | Dale | Mar. 30, 1948 |
| 2,478,702 | Moody | Aug. 9, 1949 |
| 2,515,835 | Preston | July 18, 1950 |
| 2,556,590 | Long | June 12, 1951 |
| 2,733,667 | Hill | Feb. 7, 1956 |
| 2,791,227 | Holmstrom | May 7, 1957 |
| 2,939,466 | Hill | June 7, 1960 |
| 2,987,065 | Bender | June 6, 1961 |